United States Patent
Woods et al.

(10) Patent No.: US 9,587,062 B2
(45) Date of Patent: Mar. 7, 2017

(54) PHOTOCROSSLINKABLE BLOCK COPOLYMERS FOR HOT-MELT ADHESIVES

(71) Applicants: Henkel IP & Holding GmbH, Duesseldorf (DE); Henkel AG & Co. KGaA, Duesseldorf (DE)

(72) Inventors: John G. Woods, Farmington, CT (US); Peter D. Palasz, Maidenhead (GB); Andrew Slark, Wokingham (GB); Guillaume Chauveau, Digoin (FR)

(73) Assignee: Henkel IP & Holding GmbH and Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 14/570,060

(22) Filed: Dec. 15, 2014

(65) Prior Publication Data

US 2016/0168298 A1  Jun. 16, 2016

(51) Int. Cl.
| | |
|---|---|
| C08F 2/46 | (2006.01) |
| B29C 71/04 | (2006.01) |
| C08G 61/04 | (2006.01) |
| C08F 265/06 | (2006.01) |
| C08F 120/14 | (2006.01) |
| C08F 293/00 | (2006.01) |

(52) U.S. Cl.
CPC .......... *C08F 265/06* (2013.01); *C08F 120/14* (2013.01); *C08F 293/005* (2013.01); *C08F 2438/00* (2013.01); *C08F 2438/01* (2013.01)

(58) Field of Classification Search
CPC ............................. C08F 265/06; C08F 120/14
USPC ........... 522/46, 33, 6, 1, 71, 189, 184; 520/1
See application file for complete search history.

(56) References Cited

U.S. PATENT DOCUMENTS

| | | |
|---|---|---|
| 7,868,098 B2 | 1/2011 | Loehden et al. |
| 7,999,066 B2 | 8/2011 | Balk et al. |
| 8,106,129 B2 | 1/2012 | Balk et al. |
| 8,143,354 B2 | 3/2012 | Balk et al. |
| 8,431,652 B2 | 4/2013 | Balk et al. |
| 8,802,785 B2 | 8/2014 | Kautz et al. |
| 8,816,011 B2 | 8/2014 | Kautz et al. |
| 8,895,669 B2 | 11/2014 | Balk et al. |
| 2009/0087399 A1 | 4/2009 | Kuppert et al. |
| 2009/0275707 A1 | 11/2009 | Balk et al. |
| 2009/0312498 A1 | 12/2009 | Balk et al. |
| 2010/0010178 A1 | 1/2010 | Balk et al. |
| 2010/0041852 A1 | 2/2010 | Balk et al. |
| 2011/0034623 A1 | 2/2011 | Balk et al. |
| 2011/0178246 A1 | 7/2011 | Moeller et al. |
| 2011/0213091 A1 | 9/2011 | Balk et al. |
| 2011/0269913 A1 | 11/2011 | Balk et al. |
| 2011/0282007 A1 | 11/2011 | Balk et al. |
| 2012/0053296 A1* | 3/2012 | Coffey ..................... C08F 8/00 525/100 |
| 2013/0018122 A1* | 1/2013 | Woods .................. C07C 323/52 522/35 |
| 2014/0107283 A1* | 4/2014 | Zhu ........................... C08F 2/38 524/561 |
| 2014/0275448 A1* | 9/2014 | Jacobine .................. C08F 2/01 526/62 |

FOREIGN PATENT DOCUMENTS

| | | |
|---|---|---|
| DE | 102006015846 A1 | 10/2007 |
| WO | 2007033887 A1 | 3/2007 |
| WO | 2008012116 A1 | 1/2008 |
| WO | 2008017522 A1 | 2/2008 |
| WO | 2008017523 A1 | 2/2008 |
| WO | 2008017524 A1 | 2/2008 |
| WO | 2008043583 A1 | 4/2008 |
| WO | 2008092515 A1 | 8/2008 |
| WO | 2009024495 A1 | 2/2009 |
| WO | 2009144082 A1 | 12/2009 |
| WO | 2010009911 A1 | 1/2010 |
| WO | 2010054893 A1 | 5/2010 |
| WO | 2010054894 A1 | 5/2010 |
| WO | 2010054895 A1 | 5/2010 |
| WO | 2010054896 A1 | 5/2010 |
| WO | 2010054897 A1 | 5/2010 |
| WO | 2010054898 A1 | 5/2010 |
| WO | 2014099748 A1 | 6/2014 |

OTHER PUBLICATIONS

International Search Report for International PCT Patent Application No. PCT/US2015/065660 dated Apr. 28, 2016.
Entsiklopediya polimerov. Moskva, Sovetskaya entsiklopediya, 1977, t. 1, p. 37, table 3, t. 3, p. 498.

* cited by examiner

*Primary Examiner* — Ling Choi
*Assistant Examiner* — Jessica E Whiteley
(74) *Attorney, Agent, or Firm* — James E. Piotrowski

(57) ABSTRACT

Disclosed is a method for formation of block copolymers using a Single Electron Transfer Living Radical Polymerization (SET-LRP) process. The process can be used to form di and tri-block copolymers from vinyl monomers. In one embodiment the SET-LRP process comprises initially forming a macroinitiator using SET-LRP to form a first block of a di or tri-block copolymer and then using SET-LRP to form additional blocks of the copolymer. The produced block copolymers have very narrow polydispersity indexes and controlled molecular weights. The process permits incorporation of photoinitiators in any of the block formation reactions. The method also includes purification processes that result in a block copolymer having very low color making it useful in a variety of applications. In one application block copolymers prepared according to the present process can be used in hot-melt adhesives.

29 Claims, 6 Drawing Sheets

PHOTOCROSSLINKABLE BLOCK COPOLYMERS FOR HOT-MELT ADHESIVES

TECHNICAL FIELD

This disclosure relates generally to block copolymers and their formation, more specifically, the preset disclosure relates to a method for forming block copolymers by single electron transfer living radical polymerization.

BACKGROUND

Polymeric materials find use in many areas of consumer products and industrial design. Polymeric materials are formed from individual units of monomers. When a polymer is formed from monomers that are all the same it is called a homopolymer, when a polymer is formed from a mixture of more than one monomer it is known as a copolymer. The polymers can be formed from random mixtures of monomers or the order of monomer addition can be non-random. One form of polymer with non-random addition is known as a block copolymer. In a block copolymer the polymer is formed from blocks of different monomers. For example one block could be a sequence of all methyl methacrylate monomers and another block could be all methacrylate monomers. In other examples one block can be a random mixture of two or more monomers followed by a block formed from a single monomer; these are still known as block copolymers. Block copolymers are highly desired because of the unique properties that can be achieved in polymers formed as block copolymers.

A common method for forming polymers in general is through free radical polymerization. Free radical polymerization can be used to create random polymers; however, it is not useful for creating block copolymers. Instead of free radical polymerization living radical polymerization (LRP) or controlled radical polymerization (CRP) procedures have been utilized to create polymers since the 1990s. These procedures can be used to create block copolymers, two well-known forms of these procedures are the Atom Transfer Radical Polymerization (ATRP) and Reversible Addition/Fragmentation Chain Transfer (RAFT). For these procedures the size of the final copolymers is determined by the ratio of monomer to initiator. One advantage of LRP is that because of the way the process occurs the polydispersity of the resulting copolymer tends to be lower, meaning a more uniform copolymer size range. Since the reactions proceed until the monomers are used up the processes allow one to tailor the size of the copolymer. In addition, these processes can be used to create block copolymers. One problem that has been associated with these two processes is that the polymers formed using them tend to be dark or have coloration in the polymer. It is not known what these colors are due to; however, dark coloration is generally not desired especially when the polymers are incorporated into items like labels, tapes and adhesives. In addition, the dark or colored appearance can interfere with the cure of UV curable adhesives that these polymers find use in. Another disadvantage of these processes is that sometimes the required reaction temperatures are quite high and it would be desirable to be able run the polymerization reactions at lower temperatures.

Another form of LRP is the one used in the present disclosure, namely Single Electron Transfer-Living Radical Polymerization SET-LRP. One main difference from ATRP and RAFT is that in SET-LRP the catalyst is a solid, namely, copper wire or copper mesh. One other advantage is that generally the SET-LRP process can be run at lower temperatures.

It is desirable to provide a process that would allow for relatively rapid polymerization of block copolymers having a very narrow number average molecular weight (Mn) range and to a controlled size. It is also desirable to produce block copolymers that have a polydispersity index (weight average molecular weight/number average molecular weight) (Mw/Mn) ratio that is as close to 1 as possible. It is also desirable to provide a process that can be conducted at lower temperatures and that results in copolymers with low to no color and that include UV curable crosslinking functions in the copolymer. It is especially desirable to produce block copolymers that are UV crosslinkable and that can be utilized in hot-melt adhesive systems.

SUMMARY

In general terms, this disclosure provides a process for formation of block copolymers that can be run at relatively low temperatures and that provides copolymers with narrow polydispersity, well defined size ranges, and low to no color in the copolymer. The process involves creating a macroinitiator block in a first round of SET-LRP and then adding one or more blocks onto the macroinitiator block in a second round of SET-LRP. Preferably the process is used to synthesize di and tri-block copolymers having narrow polydispersity indexes (PDI) and that are functionalized with a crosslinkable photoinitiator for use in UV curable crosslinkable hot-melt adhesives. Preferably the photoinitiator is a benzophenone.

In one embodiment the present disclosure is a method of polymerizing a macroinitiator by a single electron transfer living radical polymerization comprising the steps of: providing a reaction mixture comprising a plurality of vinyl monomers, a halogen terminated initiator, and a ligand in a solvent; purging the reaction mixture with nitrogen; and adding to the reaction mixture a solid copper hydrazine-activated catalyst and polymerizing the reaction mixture in the presence of the catalyst under a positive pressure of nitrogen to produce a polymer having a Mn of from 55,000 to 75,000 grams/mole, a polydispersity index of 1.2 to 1.8, and a glass transition temperature of less than 20° C.

In one embodiment the present disclosure is a method of polymerizing a block copolymer by a single electron transfer living radical polymerization comprising the steps of: a) combining the macroinitiator having a Mn of from 55,000 to 75,000 grams/mole with at least one additional vinyl monomer, additional solvent, and 1 equivalent of a source of Cl per terminal halogen equivalent in the macroinitiator to form a halogen exchange reaction mixture; b) incubating the halogen exchange reaction mixture at 35° C. for at least 3 hours with stirring; c) after step b) adding to the halogen exchange reaction mixture a solid copper hydrazine-activate catalyst and polymerizing the at least one additional vinyl monomer for a period of time sufficient to increase the molecular weight of the macroinitiator by 4,000 to 15,000 grams/mole while maintaining the polydispersity index at 1.2 to 1.8.

In one embodiment the present disclosure is a method of polymerizing a macroinitiator by a single electron transfer living radical polymerization comprising the steps of: providing a reaction mixture comprising at least one vinyl monomer, a halogen terminated initiator, and a ligand in a solvent; purging the reaction mixture with nitrogen; and adding to the reaction mixture a solid copper hydrazine-activated catalyst and polymerizing the reaction mixture in the presence of the catalyst under a positive pressure of nitrogen to produce a polymer having a Mn of from 4,000 to 15,000 grams/mole, a polydispersity index of 1.2 to 1.8, and a glass transition temperature of greater than 80° C.

In one embodiment the present disclosure is a method of polymerizing a block copolymer by a single electron transfer living radical polymerization comprising the steps of: combining the macroinitiator having a Mn of from 4,000 to 15,000 grams/mole with at least one additional vinyl monomer, solvent, and ligand; incubating the reaction mixture with stirring for a period of time sufficient to form a clear reaction mixture; adding to the clear reaction mixture a solid copper hydrazine-activate catalyst and polymerizing the at least one additional vinyl monomer for a period of time sufficient to increase the molecular weight of the macroinitiator by 55,000 to 75,000 grams/mole while maintaining the polydispersity index at 1.2 to 1.8.

In one embodiment the present disclosure is a hot melt adhesive comprising di and/or tri-block copolymers made by the above methods.

These and other features and advantages of this disclosure will become more apparent to those skilled in the art from the detailed description of a preferred embodiment. The drawings that accompany the detailed description are described below.

DETAILED DESCRIPTION OF AN EMBODIMENT

Figure 1:
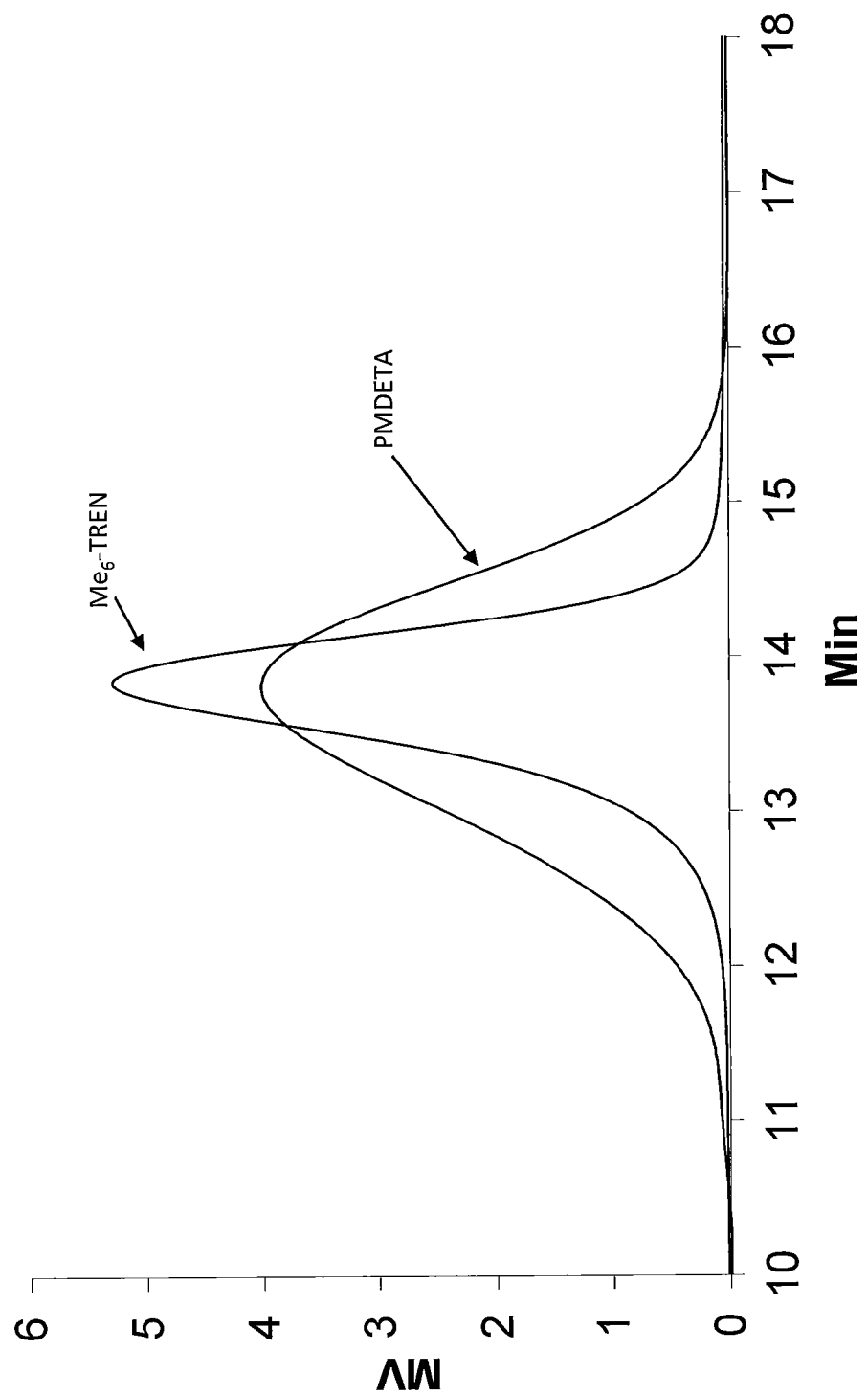
FIG. 1 shows the effect of ligand identity on formation of a Soft Block copolymer prepared according to the present disclosure.

Hot melt adhesive compositions are solid at room temperature but, upon application of heat, melt to a liquid or fluid state in which molten form they are applied to a substrate. On cooling, the adhesive composition regains its solid form. The hard phase(s) formed upon cooling of the adhesive composition impart all of the cohesion (strength, toughness, creep and heat resistance) to the final bond. Hot melt adhesive compositions are thermoplastic and can be heated to a fluid state and cooled to a solid state repeatedly. Hot melt adhesive compositions do not include water or solvents.

Curable or reactive hot melt adhesive compositions are also solid at room temperature and, upon application of heat, melt to a liquid or fluid state in which molten form they are applied to a substrate. On cooling, the adhesive composition regains its solid form. The phase(s) formed upon cooling of the adhesive composition and prior to curing impart initial or green strength to the bond. Components of the adhesive composition will cure by a chemical crosslinking reaction upon exposure to suitable conditions such as exposure to radiation. Before curing the adhesive composition remains thermoplastic and can be remelted and resolidified. Once cured, the adhesive composition is in an irreversible solid form and is no longer thermoplastic. The crosslinked adhesive composition are more resistant to heat than thermoplastic hot melt adhesives.

The present disclosure is directed toward formation of di and tri-block copolymers especially for use as a component of a hot-melt adhesive. Unless specifically noted, throughout the present specification and claims the term molecular weight when referring to polymers and macroinitiators refers to the polymer's number average molecular weight (Mn). In one embodiment it is preferred that the copolymers comprise one or more Hard Blocks of methyl methacrylate combined with one or more Soft Blocks formed from a combination of acrylates and methacrylates. Especially preferred for the Soft Block is a combination of the acrylates: 2-ethylhexyl acrylate (2-EHA), n-butyl acrylate (nBA), methacrylate (MA), and tert-butyl acrylate (tBA). Especially preferred is to convert the polymerized tBA to acrylic acid via acid hydrolysis or thermolysis after formation of the Soft Block(s). In the tri-block copolymers you can have either two Hard Blocks with one Soft Block or two Soft Blocks with one Hard Block. Preferably the block copolymers also include photoinitiators to provide for UV curable crosslinking of the polymers. Preferably the photoinitiator is a benzophenone. The photoinitiator can be incorporated into any of the blocks of the copolymers to provide UV curable crosslinking.

The Soft Block copolymers according to the present disclosure preferably comprise random acrylate copolymers and have a glass transition temperature (Tg) of less than 20° C. Preferably, the copolymers are a blend of 2-ethylhexyl acrylate (2-EHA), n-butyl acrylate (nBA), methyl acrylate (MA), and tert-butyl acrylate (tBA). In one embodiment these are combined in a molar proportion of 28/42/25/5 of 2-EHA/nBA/MA/tBA to form the Soft Block copolymer portion. In one embodiment, after incorporation the tBA is converted to an acrylic acid function by acid hydrolysis or thermolysis. In a preferred embodiment the target Soft Block Mn is about 55,000 to 75,000 grams/mole with a polydispersity index of 1.2 to 1.8. Because of the high desired molecular weight and the use of 2-EHA, the Soft Block copolymer is not fully soluble in the preferred solvent of dimethyl sulfoxide (DMSO). Therefore, the solvent used for polymerization of the Soft Blocks is preferably a mixture of DMSO and ethyl acetate, preferably at a weight ratio of total solvent to total monomer level of from 2:1 to 1:2.

The Hard Block polymer is preferably a poly methyl methacrylate (PMMA) polymer. Preferably the Hard Block has a Mn of from 4,000 to 15,000 grams/mole. Given the much smaller size and the lack of 2-EHA the Hard Block is preferably polymerized in the solvent DMSO with no ethyl acetate. Preferably the Hard Block has a glass transition temperature Tg of greater than 80° C., and more preferably approximately 110 to 115° C. as determined by Differential Scanning calorimetry (DSC). The weight/weight ratio of solvent to monomer during polymerization is preferably from 2:1 to 1:2. Additionally, it was found that the level of copper catalyst should be in the range of from 1 to 5 equivalents copper catalyst relative to the initiator for the desired formation of the Hard Block. If the amount of copper catalyst was greater than 5 equivalents the reaction and percentage of conversion slowed significantly. It is preferred that the conversion rate be in the range of 80 to 95% after approximately 20 to 30 hours, more preferably 24 to 27 hours. In the presence of 10 equivalents of copper catalyst the maximum conversion was only 70%. Preferably the Hard Block has a syndiotacticity of from 0.56 to 0.65; this is confirmed in the present disclosure using $^1$H-NMR analysis. The amount of PMMA block incorporated into the di and tri block copolymers will significantly influence the melt-viscosity of the di and tri block copolymers. At a level of 30% by weight the PMMA Hard Block drives the melt temperature of the block copolymers to over 180° C. When the PMMA Hard Block is at a level of less than or equal to 10% by weight the block copolymers are easily melted at 180° C. which is desired for an end use in hot-melt adhesives. Thus, it is desirable to maintain the level of Hard Block polymer at 10% by weight to 1% by weight, more preferably at 7% to 1% by weight, most preferably at 5% to 1% by weight or less based on the total block copolymer weight.

The Hard Block and Soft Block polymers can be combined in any way. For example, one of the blocks can be created using either a mono-functional initiator or a di-functional initiator. This block is then used as a macroinitiator to add the other block(s). Thus, if one begins with a mono-functional initiator the end result is a di-block copolymer. If one begins with a di-functional initiator the end result is a tri-block copolymer with the macroinitiator in the center and the other blocks extending from it. As discussed below the photoinitiator used to provide UV curable crosslinkable functionality to the block copolymer can be incorporated into either the Hard Block(s) or the Soft Block(s).

One of the preferred photoinitiators for use in the present disclosure is 4-benzoylphenyl methacrylate. All photoinitiators used in the present disclosure are polymerizable meaning they can be included with the monomer feeds during a polymerization reaction and thereby be polymerized into the polymer. The photoinitiator 4-benzoylphenyl methacrylate can be obtained commercially from several sources. It can be incorporated into either the Hard Block(s) or the Soft Block(s) of the block copolymers. It is generally incorporated at a positive amount of up to 1% based on the total number of moles of monomer in the feed, in other words at up to 1 mole % based on total monomer moles in the feed for the polymer, to provide effective UV crosslinking activity to the block copolymers; however the level used is determined by the needed crosslinking functionality and can be higher. The crosslink occurs between two benzoylphenyl methacrylates. To incorporate it into a given block it is simply added into the feed with the monomer(s) for formation of the block at the desired level. Other copolymerizable benzophenone-functionalized monomers can be used as well as non-cleavage photoinitiators. For example purposes only these polymerizable photoinitiators include (methyl)acrylate ester substituted xanthones, thioxanthones, benzyl, phenanthrenequinone, anthraquinone, and substituted benzophenones as well as other photoinitiators known to those of skill in the art. Incorporation of these photoinitiators provides UV curable crosslinking function to the block copolymers. These UV curable block copolymers find special use in hot-melt adhesives.

Reagents

The monomers 2-ethylhexyl acrylate (2-EHA), n-butyl acrylate (nBA), methyl acrylate (MA), test-butyl acrylate (tBA), and methyl methacrylate (MMA) were all 98% pure and used as received from Aldrich. The copper wire used as a catalyst was 20 gauge, 0.812 millimeters in diameter, and was obtained from Fisher. The copper was activated by immersion in a solution of hydrazine hydrate, 3 drops per 20 milliliters of acetone, for 10 minutes followed by exhaustive rinsing in acetone. The rinsed copper wire was then dried under nitrogen and used immediately. The ligand hexamethylated tris (2-aminoethyl) amine (Me$_6$TREN) was synthesized as known in the art, Ciampolini, M., Five-Coordinated High-Spin Complexes of Bivalent Cobalt, Nickel and Copper With Tris(2-dimethylaminoethyl) amine, Inorg. Chem., 1966, 5 (1), p 41. The ligand N,N,N',N',N-pentamethyldiethylenetriamine (PMDETA) was obtained from Aldrich and used as received. The di-functional initiator dimethyl 2,6-dibromoheptanedioate, 97%; mono-functional initiator methyl-2-bromopropionate, 98%; sodium chloride, greater than 99%; hydrazine hydrate, 100% with 64% hydrazine; etidronic acid monohydrate, 95%; and sodium sulfate, greater than 99% were all used as received from Aldrich. The ethyl acetate, greater than 99%, and dimethyl sulfoxide (DMSO), greater than 99%, were used as received from VWR.

$^1$H-NMR Methods

The $^1$H-NMR spectra were recorded on a 300 MHz Varian Mercury Plus instrument using the Varian VNMRJ 1.1D operating software and the ACD/NMR Processor 12.01 analysis software. The samples were prepared at 10-20 milligrams/milliliter (mg/ml) in chloroform-d with 0.03% tetramethylsilane as an internal standard. The relaxation time was set to 10 seconds and 32 spectra were accumulated. The degree of a Soft Block conversion was determined via $^1$H-NMR spectroscopy, using the ratio of the signal areas from the vinyl protons, $\delta$~6.50-6.00 ppm 3H/mol to the signal areas from the backbone polymer protons, $\delta$~2.4 ppm. The degree of a Hard Block conversion was determined via $^1$H-NMR spectroscopy, using the ratio of the signal areas from the O—CH$_3$ from the monomer, $\delta$~3.60 ppm 3H/mol to the signal areas from the O—CH$_3$ from the polymer, $\delta$~3.45 ppm.

Gel Permeation Chromatography (GPC) Methods

A Waters Size Exclusion Chromatography (SEC) system was used for GPC analysis. The system had a 1525 binary HPLC pump, a 717 autosampler, a 2487 dual $\lambda$ absorbance and refractive index detector, running Empower 2 software. The separation was performed using 100 microliter ($\mu$l) samples at about 10 mg/ml in tetrahydrofuran (THF) using two Waters PolyPore columns, 300×7.5 millimeter (mm), connected in series at a constant flow rate of 1 ml/minute THF. A twelve point calibration curve was obtained using PMMA standards from Polymer Standard Service, the standards had sizes of between 800 and 1,820,000 grams/mole (g/mole).

Differential Scanning Calorimetry (DSC) and Thermogravimetric Analysis (TGA) Methods The DSC analysis was carried out in a TA Instruments DSC Q 2000 coupled with a TA Instruments refrigerated cooling system 90. The TGA analysis was performed in a TA Instruments TGA Q 500. The output from both systems was collected and analyzed with TA Instruments Analysis software.

Effect of Ligand Identity on the SET-LRP Process

Because the ligand is a key functional entity in the SET-LRP process to enable disproportion of the Cu$^1$X in initial experiments the identity of the ligand was varied in a process for formation of a Soft Block copolymer. The two ligands tested were N,N,N',N',N-pentamethyldiethylenetriamine (PMDETA) and Me$_6$TREN. The polymerization conditions for the test Soft Block copolymers were the same except for the identity of the ligand. In one experiment the ligand was PMDETA at 0.5 equivalents and in the other the ligand was $Me_6TREN$ at 0.2 equivalents relative to the initiator.

The Soft Blocks were prepared using the components given below in TABLE 1. These Soft Blocks have on a mole proportion basis 42/28/25/5 of nBA/2-EHA/MA/tBA. The monomers, DMSO, ethyl acetate, methyl 2-bromopropionate initiator, and ligand, either PMDETA or $Me_6TREN$, were added to a 250 ml 4-necked flask. The flask was fitted with a mechanical stirrer, heating mantel, reflux condenser, thermocouple, nitrogen inlet with sparging tube, and a septum-sealed addition port. The mixture was mechanically stiffed for 10 minutes to give a clear solution and then degassed with a low flow of nitrogen through the sparging tube for 20 minutes at room temperature. The bubbling tube was removed and the reactor headspace was swept with nitrogen for 10 minutes. The hydrazine-activated copper wire, 7.6 $cm^2$, was wound into a coil and added to the reactor. The reactor was sealed and maintained under a slight positive pressure of nitrogen at just above atmospheric pressure. The reactions were run at room temperature during the entire reaction period. Samples were withdrawn for testing at selected time points using a nitrogen-purged gas-tight syringe inserted via the septum.

After a total of 23 hours of reaction time in the presence of the ligand $Me_6TREN$ the conversion was 97%, the viscosity of the solution had increased, and the color of the solution was a light green with slight opacity. The copper wire was removed from the reactor and the contents were exposed to air for 30 minutes to quench the reaction. The polydispersity index (PDI) of this sample was 1.19 and it had a molecular weight by GPC of 76,800, which is very close to the theoretical molecular weight.

After a total of 50 hours of reaction time in the presence of the ligand PMDETA the conversion was only 95%, the viscosity of the solution had increased, and the color of the solution was a light green with slight opacity. The copper wire was removed from the reactor and the contents were exposed to air for 30 minutes to quench the reaction. The PDI value of this sample was 1.64 and it had a molecular weight by GPC of 75,900.

The results of the GPC analysis for both products are shown in FIG. 1. In conclusion, the ligand $Me_6TREN$ at a lower equivalence level is much more effective in speeding up the reaction kinetics, and more effective in producing a very narrow polydispersity. Thus, the ligand $Me_6TREN$ is preferred in the present process over PMDETA. The curve for the product prepared in the presence of the PMDETA has a much broader distribution and nearly the same peak size. $^1$H-NMR analysis was used to confirm the structure of the produced Soft Block. The $^1$H-NMR analysis showed 2% residual monomers in the preparation framed using the PMDETA and 1% in the preparation formed using $Me_6TREN$.

TABLE 1

| Component | Grams | Millimoles | Monomer mole % | Volume milliliters |
|---|---|---|---|---|
| 2-EHA | 20 | 108 | 28 | |
| nBA | 20 | 156 | 42 | |
| MA | 7.66 | 89 | 25 | |
| tBA | 2.42 | 18 | 5 | |
| DMSO | | | | 40 |
| Ethyl acetate | | | | 40 |
| Methyl 2-bromopropionate | 0.189 | 1.11 | | |
| Ligand | | 0.222 or 0.555 | | |
| Activated copper wire | 1.414 | 22.25 | | |

Formation of a Tri-Block Copolymer Using a Di-Functional Hard Block Macroinitiator Formation and Purification of a Hard Block Di-Functional Macroinitiator A di-functional Hard Block macroinitiator was prepared using the components given below in TABLE 2. The MMA, DMSO, dimethyl 2,6-dibromoheptanedioate initiator, and $Me_6TREN$ were added to a 250 ml 4-necked flask. The flask included a mechanical stirrer, heating mantel, reflux condenser, thermocouple, nitrogen inlet with sparging tube, and septum-sealed addition port. The mixture was stirred for 10 minutes to give a clear solution and then degassed with a low flow of nitrogen through the sparging tube for 20 minutes at room temperature. The bubbling tube was removed and the reactor headspace was swept with nitrogen for 10 minutes. The hydrazine-activated copper wire, used at 5 equivalents 20.31 $cm^2$, was wound into a coil and added to the reactor. The reactor was sealed and maintained under a slight positive pressure of nitrogen at just above atmospheric pressure. The reaction temperature increased slowly over the next three hours to 25° C., when it reached 25° C. the reaction mixture was heated to 30° C. and maintained at that temperature for an additional 21 hours. After a total of 24 hours of reaction time the conversion was 80%. The theoretical molecular weight based on % conversion was calculated to be 6,000 g/mole and the molecular weight by GPC was 10,200 g/mole with a PDI of 1.53. The copper wire was removed from the reactor and the contents were exposed to air for 30 minutes to quench the reaction. Ethyl acetate was added to the crude reaction mixture and it was washed three times with 50 ml of a 20% by weight brine solution of NaCl in a separatory funnel. The first two washing were for 2 hours each and the third was for 14 hours. The aqueous phase, on the bottom, was removed and the organic phase was dried overnight for 16 hours over sodium sulfate. The ethyl acetate was removed via rotovap at 75° C. for 4 hours. The purified Hard Block was a white powder with no dark discoloration.

TABLE 2

| Component | Grams | Millimoles | Volume milliliters |
|---|---|---|---|
| MMA | 80 | 800 | |
| DMSO | | | 80 |
| dimethyl 2,6-dibromoheptanedioate | 4.32 | 12 | |
| $Me_6TREN$ | 0.552 | 2.4 | |
| Activated copper wire | 3.78 | | |

Formation of a Tri-Block Copolymer Using the Hard Block Macroinitiator

The Hard Block from above was dissolved in a solvent mixture of DMSO and ethyl acetate. The Hard Block was then used as a macroinitiator. The polymerization components are given in TABLE 3 below. The monomers, solvents, macroinitiator and ligand were added to a 1 Liter 4 neck reaction flask fitted with a mechanical stirrer, heating mantel, reflux condenser, thermocouple, nitrogen inlet with sparging tube and septum-sealed addition port. The mixture was stirred for 4 hours to give a clear solution and then degassed with bubbling nitrogen for 20 minutes at room temperature. The reactor headspace was swept with nitrogen for 10 minutes and then sealed and maintained under slightly above atmospheric pressure under nitrogen. A hydrazine-activated copper mesh 38 cm$^2$ was wound into a coil and added to the reactor which was kept under slight positive pressure with nitrogen. The temperature increased slowly over three hours to 35° C. and it was then maintained at this temperature. The reaction was run for 24 hours total, the conversion by $^1$H-NMR analysis was 97%.

TABLE 3

| Component | Grams | Millimoles | Volume milliliters |
|---|---|---|---|
| 2-EHA | 103 | 561 | |
| nBA | 104 | 815 | |
| MA | 40 | 463 | |
| tBA | 13 | 104 | |
| DMSO | | | 220 |
| Ethyl acetate | | | 220 |
| Hard Block macroinitiator | 42.41 | 6.525 | |
| Me$_6$TREN | 0.300 | 1.305 | |
| Activated copper wire | 1 | | |

Figure 2:
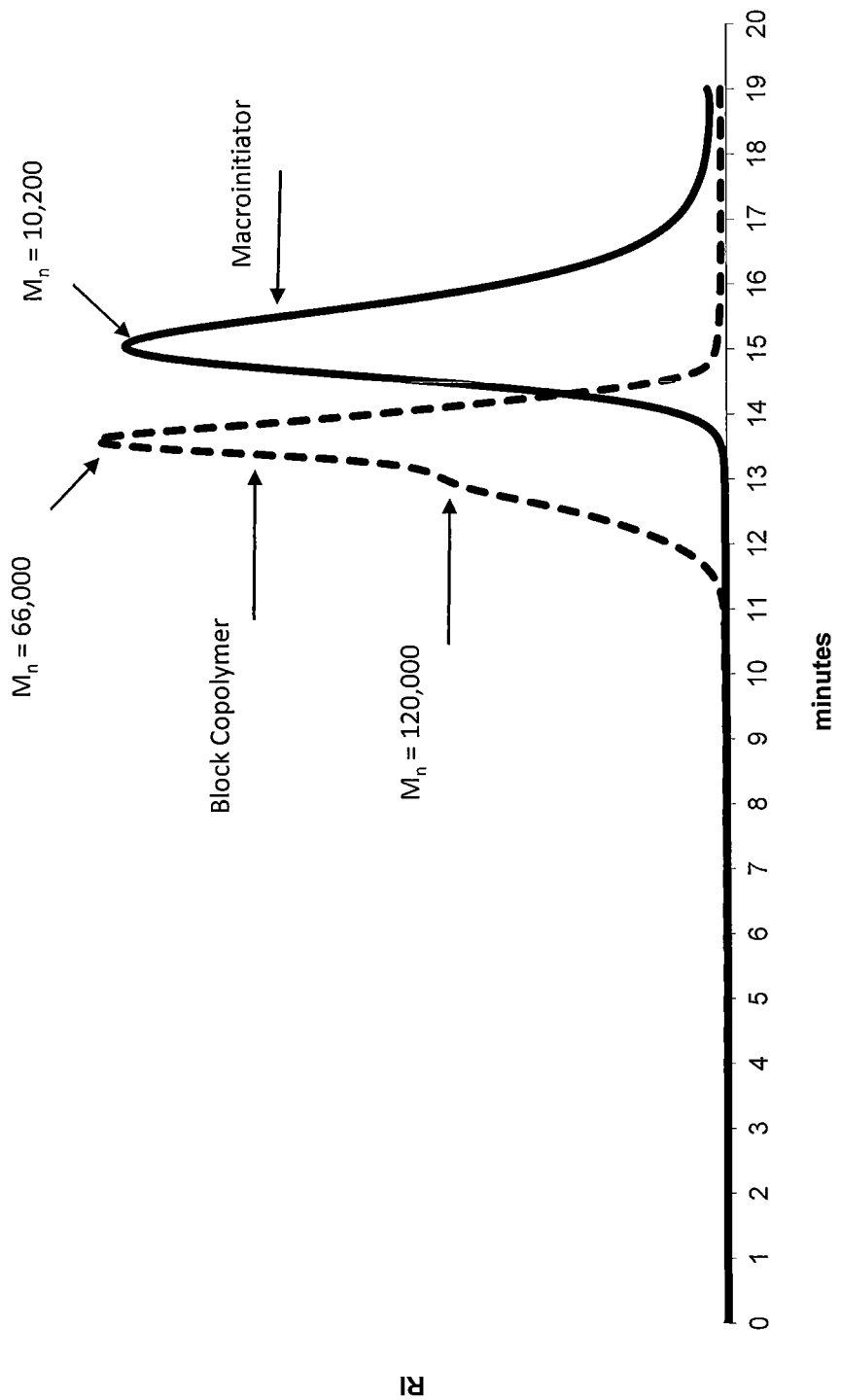
FIG. 2 shows Gel Permeation Chromatography (GPC) tracings for a Hard Block macroinitiator and a block copolymer prepared from it.

Samples of the Hard Block macroinitiator and the formed tri-block copolymer were analyzed by GPC and the results are shown in FIG. 2. The results showed a clean shift in the number average molecular weights (Mn) from 10,200 grams per mole to a Mn of 66,000 and reduction of the polydispersity index (weight average molecular weight/number average molecular weight) (Mw/Mn) from 1.53 to 1.40. The results suggest 100% functionalization of the Hard Block macroinitiator by this process.

Formation of a Tri-Block Copolymer Using a Di-Functional Soft Block Macroinitiator Formation of a Soft Block Di-Functional Macroinitiator The Soft Block was prepared using the components given below in TABLE 4, the target desired weight was 75,000 g/mole. The monomers at 560 equivalents, DMSO, ethyl acetate, dimethyl 2,6-dibromoheptanedioate initiator 1 equivalent, and Me$_6$TREN ligand 0.01 equivalents were added to a 250 ml 4-necked flask. The flask was fitted with a mechanical stirrer, heating mantel, reflux condenser, thermocouple, nitrogen inlet with sparging tube, and a septum-sealed addition port. The mixture was mechanically stirred for 10 minutes to give a clear solution and then degassed with a low flow of nitrogen through the sparging tube for 20 minutes at room temperature. The bubbling tube was removed and the reactor headspace was swept with nitrogen for 10 minutes. The hydrazine-activated copper wire wound in a coil, 30 equivalents relative to the initiator, and CuBr$_2$, 0.2 equivalents, were added to the reactor. The reactor was sealed and maintained under a slight positive pressure of nitrogen. The reaction temperature increased slowly over the next three hours to 28° C., thereafter the reaction mixture was heated to 30° C. and maintained at that temperature for an additional 7 hours. Samples were withdrawn for testing at selected time points using a nitrogen-purged gas-tight syringe inserted via the septum. After a total of 10 hours of reaction time the conversion was 82% as confirmed by $^1$H-NMR analysis. The copper wire was removed from the reactor and the contents were exposed to air for 30 minutes to quench the reaction. The molecular weight of the Soft Block by GPC analysis was 61,340 g/mole, the theoretical molecular weight was 61,500 g/mole and the polydispersity index was 1.15.

TABLE 4

| Component | Grams | Millimoles | Monomer mole % | Volume milliliters |
|---|---|---|---|---|
| 2 EHA | 20 | 108 | 28 | |
| nBA | 20 | 156 | 42 | |
| MA | 7.66 | 89 | 25 | |
| tBA | 2.42 | 18 | 5 | |
| DMSO | | | | 40 |
| Ethyl acetate | | | | 40 |
| dimethyl 2,6-dibromoheptanedioate | 0.400 | 1.11 | | |
| Me$_6$TREN | 0.051 | 0.222 | | |

Formation of a Tri-Block Copolymer Using the Di-Functional Soft Block Macroinitiator The target addition was 5,000 g/mole of the Hard Block. The reaction was run by adding to the Soft Block macroinitiator from above: MMA 100 equivalents relative to the macroinitiator, Me$_6$TREN 0.2 equivalents, DMSO, and ethyl acetate. The flask was purged with nitrogen bubbling as described above. Then freshly activated copper wire, 30 equivalents relative to Soft Block macroinitiator, was added to the reaction mixture. The reaction was run at a temperature of 40° C. for 48 hours which resulted in 90% conversion by $^1$H-NMR analysis. The theoretical molecular weight was 74,000 g/mole and the molecular weight by GPC was 71,950 g/mole with a polydispersity index of 1.37. The resulting block copolymer was purified by methanol precipitation.

Figure 3:
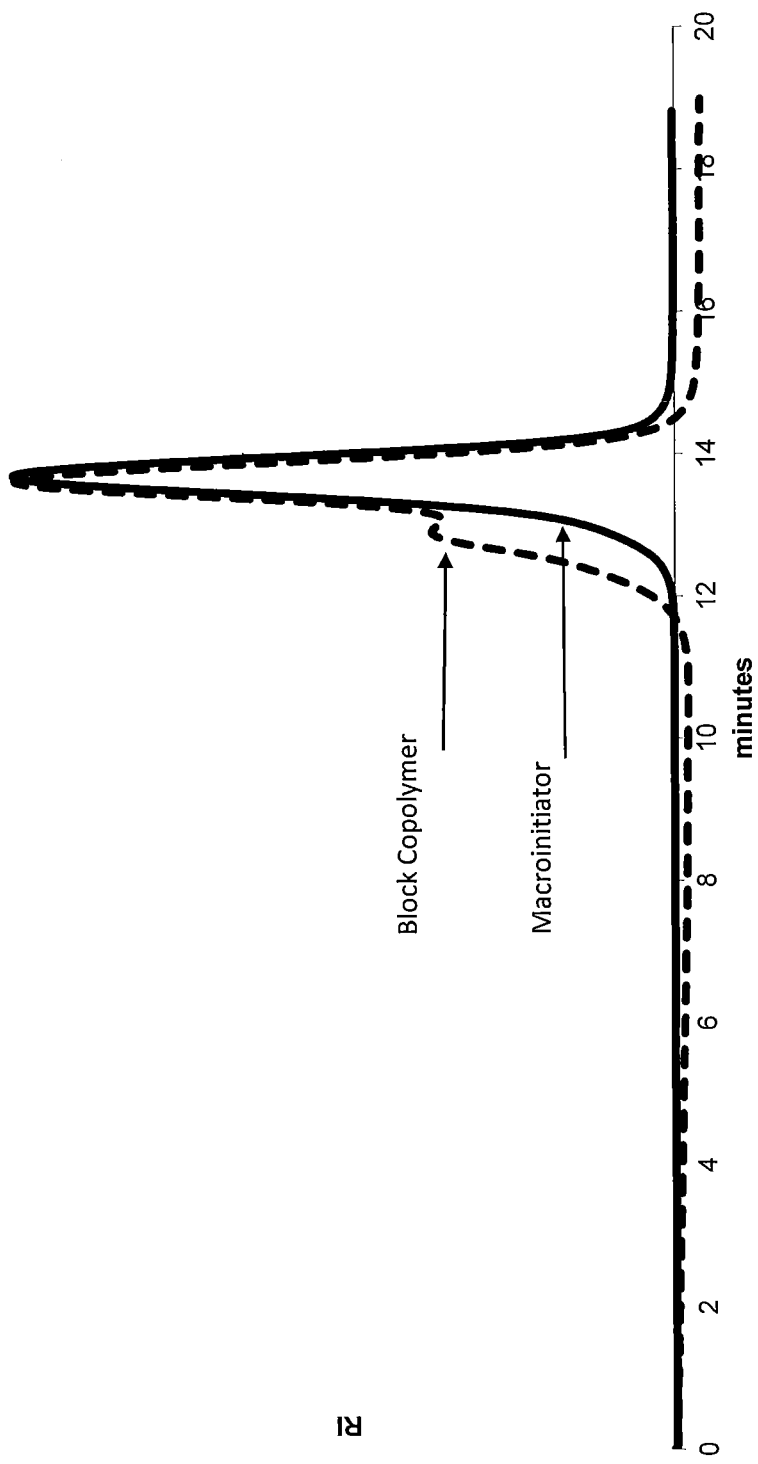
FIG. 3 shows GPC tracings for a Soft Block macroinitiator and a block copolymer prepared from it.

Analysis of the Soft Block macroinitiator and the resulting tri-block copolymer by GPC showed that very little of the desired tri-block copolymer was formed, see FIG. 3. These results suggest that reinitiation of the MMA from the bromine-terminated Soft Block macroinitiator was inefficient.

Halide Exchange Reaction of Soft Block Macroinitiator

Figure 4:
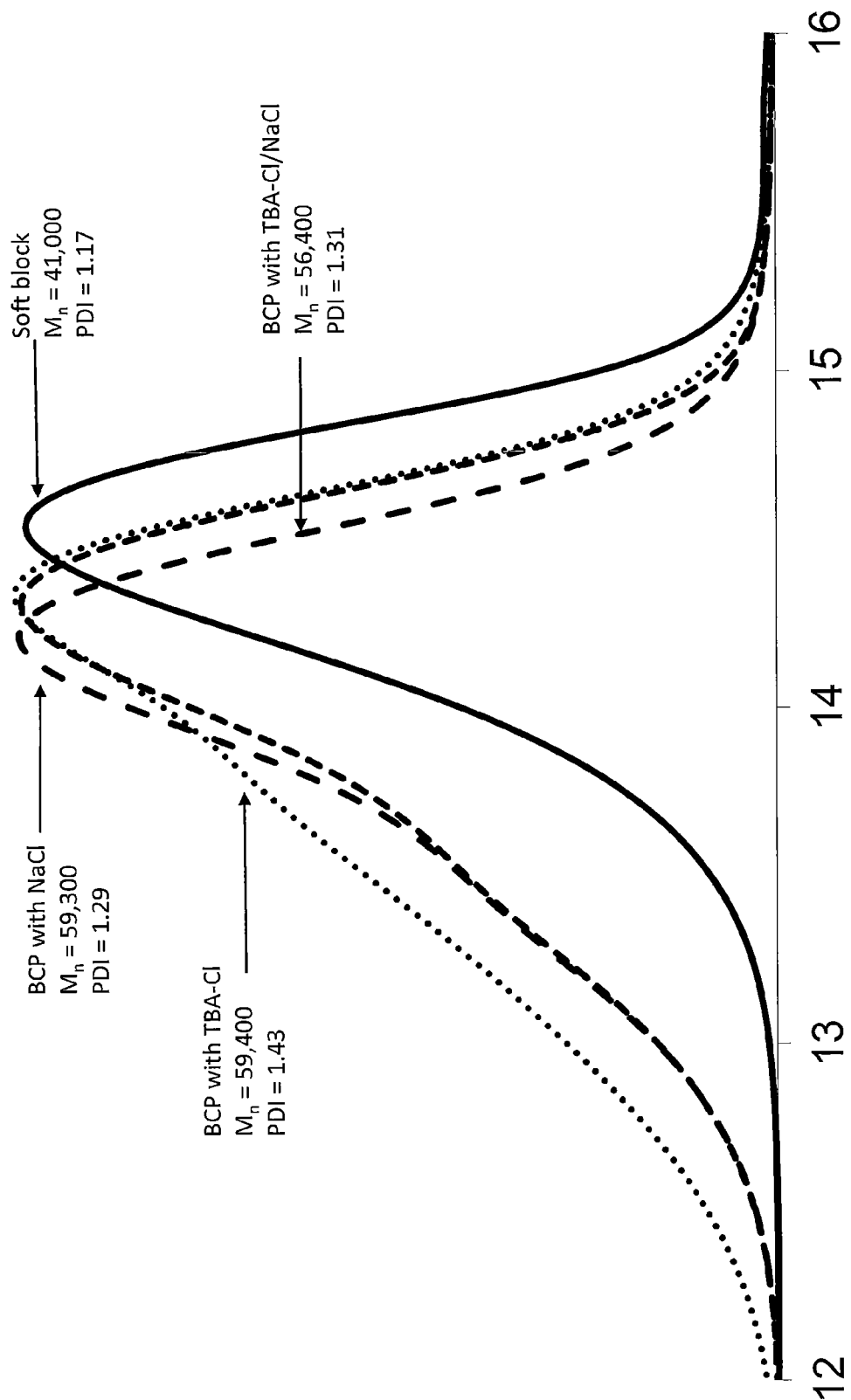
FIG. 4 shows GPC tracings of the effects of halogen exchange reactions of Soft Block macroinitiators on the block copolymers prepared from them.

To resolve the issue with poor reinitiation of MMA onto the Soft Block macroinitiator a series of halide exchange reactions were tested. The purpose was to exchange the Soft Block terminal bromines with chloride. Three exchange solutions were tested: sodium chloride, tetrabutylammonium chloride (TBAC), and a blend of sodium chloride and TBAC. Other potential sources of chloride include, by way of example, potassium chloride, cesium chloride, lithium chloride, magnesium chloride, calcium chloride, tetraethylammonium chloride, methyltriphenylphosphonium chloride, and benzyltrimethylammonium chloride. The process was to add 2 equivalents of a source of chloride relative to the Soft Block macroinitiator. The chloride source was added to the Soft Block macroinitiator with stirring at 35° C. for three hours along with the MMA, 11.13 grams 0.111 mmoles, DMSO 20 ml, and ethyl acetate 20 ml. Then the flask was purged and the copper catalyst was added to the reaction mixture, the mixture was purged, sealed and run for an additional 24 hours at 35° C. After the reaction period samples were analyzed by GPC and the results are shown in FIG. 4. The results shown the expected shift in molecular weight toward higher weights, the shift is small because the amount of Hard Block desired to be added is small. The results show that nearly all of the Soft Block macroinitiator re-initiated polymerization of the MMA. The best results were obtained with sodium chloride as the source of chloride which produced a tri-block copolymer product having a Mn of 59,300 grams/mole and with a polydispersity index of 1.29, lower than the other two conditions. The Soft Block macroinitiator had a Mn of 41,000 gram/mole and a polydispersity index of 1.17. The tri-block copolymer formed after an exchange reaction with TBAC had a Mn of 59,400 gram/mole and a polydispersity index of 1.43. The tri-block copolymer formed after an exchange reaction with a combination of NaCl and TBAC had a Mn of 56,400 grams/mole and a polydispersity index of 1.31.

Formation of Di-Block Copolymers Using Hard Block or Soft Block Macroinitiators

A mono-functional Hard Block macroinitiator was prepared as follows. To a 250-mL glass reactor equipped with mechanical stirrer, thermocouple, nitrogen purge line and heating mantle the following were added: methyl methacrylate (40.02 g, 0.04 moles); methyl 2-bromopropropionate mono-functional initiator (0.6637 g, 0.0039 moles); Me$_6$TREN (0.052 g, 0.23 millimoles); and DMSO (44 mL). The mixture was cooled to about 10° C. and purged by bubbling nitrogen into the mixture for 30 minutes. Hydrazine-activated 20-gauge copper wire (1.16 g, 0.018 moles) was added and mixture stirred at ambient temperature for 48 hours. The crude product was diluted in ethyl acetate (175 mL) and the solution was washed several times with water to remove the DMSO and copper salts. The solvent was evaporated to yield the Hard Block macroinitiator mono bromo-terminated PMMA, 22.8 g for a 56% yield. The Hard Block macroinitiator had a molecular weight of 22,500 and a monomodal polydispersity equal to 1.41 as determined by GPC calibrated to PMMA standards. The structure of the Hard Block macroinitiator was confirmed by $^1$H NMR analysis. The Hard Block macroinitiator showed a distinctive Tg at about 110° C. and a dominant syndiotactic stereoregularity similar to what is reported in the literature. Specifically, it was found that the syndiotactic level was 60%, the atactict level was 35% and the isotactic level was 5%.

Figure 5:
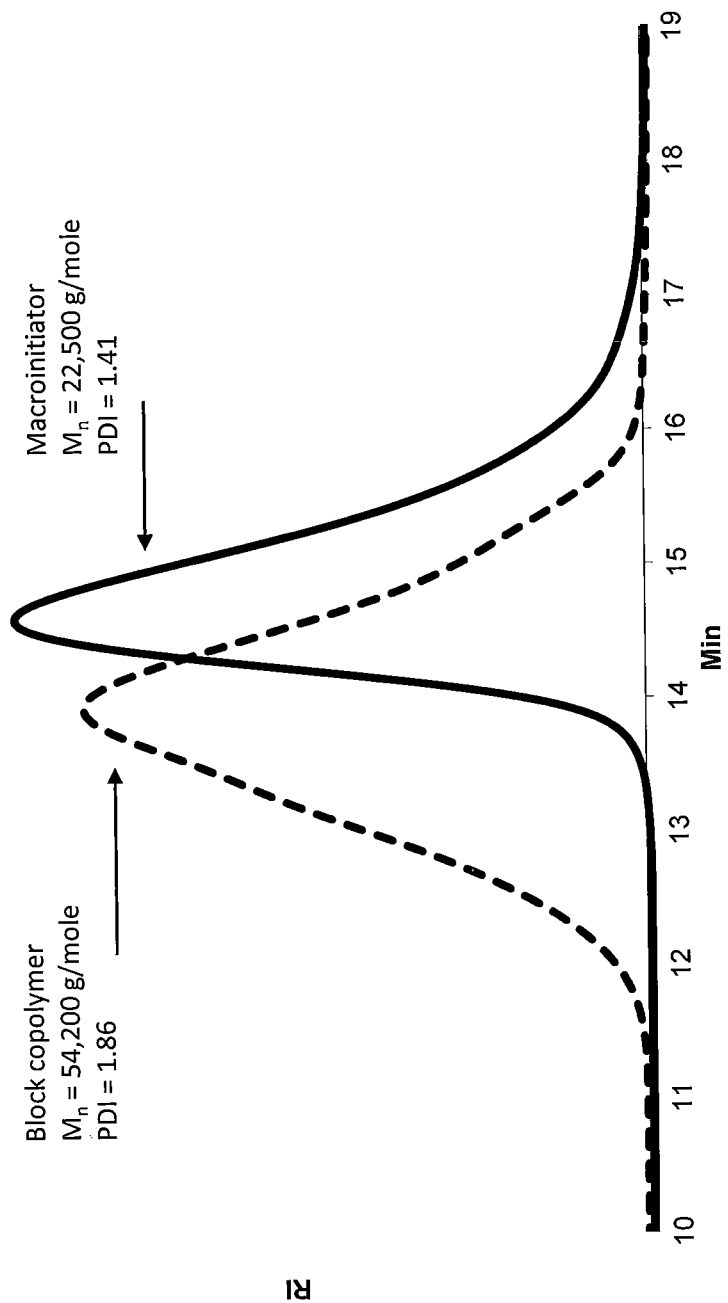
FIG. 5 shows GPC tracings of a mono-functional Hard Block macroinitiator and a block copolymer prepared from it.

The di-block copolymer using the above mono-functional Hard Block macroinitiator was prepared as follows. To a 250-mL glass reactor equipped with mechanical stirrer, thermocouple, nitrogen purge line and heating mantle the following were added: the above described Hard Block macroinitiator (3.18 g, 0.14 millimoles); 2 EHA (3.57 g, 19.4 millimoles); nBA (3.60 g; 28.1 millimoles); MA (1.34 g, 15.6 millimoles), tBA (0.50 g, 3.9 millimoles), Me$_6$TREN (0.012 g, 0.052 millimoles); DMSO, 25 mL; and ethyl acetate 25 mL. The mixture was stirred to dissolve the ingredients, cooled to about 12° C. and purged by bubbling nitrogen into the mixture for 30 minutes to remove oxygen. Hydrazine-activated 20-gauge copper wire (0.265 g, 4.17 millimoles) was added and the mixture heated at 30° C. until all the monomer was consumed. The structure of the product was confirmed by $^1$H NMR analysis to be the desired block copolymer. GPC analysis of the block copolymer indicated a molecular weight of 54,200 and a monomodal polydispersity of 1.86, relative to PMMA standards. The GPC indicated complete conversion of the lower molecular weight Hard Block macroinitiator. The GPC tracings for the Hard Block macroinitiator and the block copolymer prepared from it are shown in FIG. 5.

A mono-functional Soft Block macroinitiator incorporating benzophenone photoinitiator groups in the Soft Block was prepared as follows. To a 1 L glass reactor equipped with mechanical stirrer, thermocouple, nitrogen purge line and heating mantle the following were added: 2-EHA (100.0 g, 0.543 moles); nBA (100.0 g, 0.781 moles); MA (39.3 g, 0.457 moles); tBA (11.1 g, 0.087 moles); 4-benzoylphenyl methacrylate (4.78 g, 0.018 moles); methyl 2-bromopropionate (0.769 g, 0.0046 moles); Me$_6$TREN (0.210 g, 0.91 millimoles); ethyl acetate, 200 mL; and DMSO, 200 mL. The mixture was stirred to dissolve the ingredients, cooled to about 10° C. and purged by bubbling nitrogen into the mixture for 30 minutes to remove oxygen. The purge was removed and hydrazine-activated 20-gauge copper wire (0.90 g, 0.014 moles) was added. The reaction mixture was allowed to return to ambient temperature and stirred under a positive pressure of nitrogen for 20 hours. An aliquot of the mixture was removed for $^1$H NMR spectral analysis, which indicated a 97% conversion of monomers and confirmed the expected structure. GPC analysis of the product showed a molecular weight of 58,000 g/mole and a PDI of 1.28 relative to PMMA standards.

Figure 6:
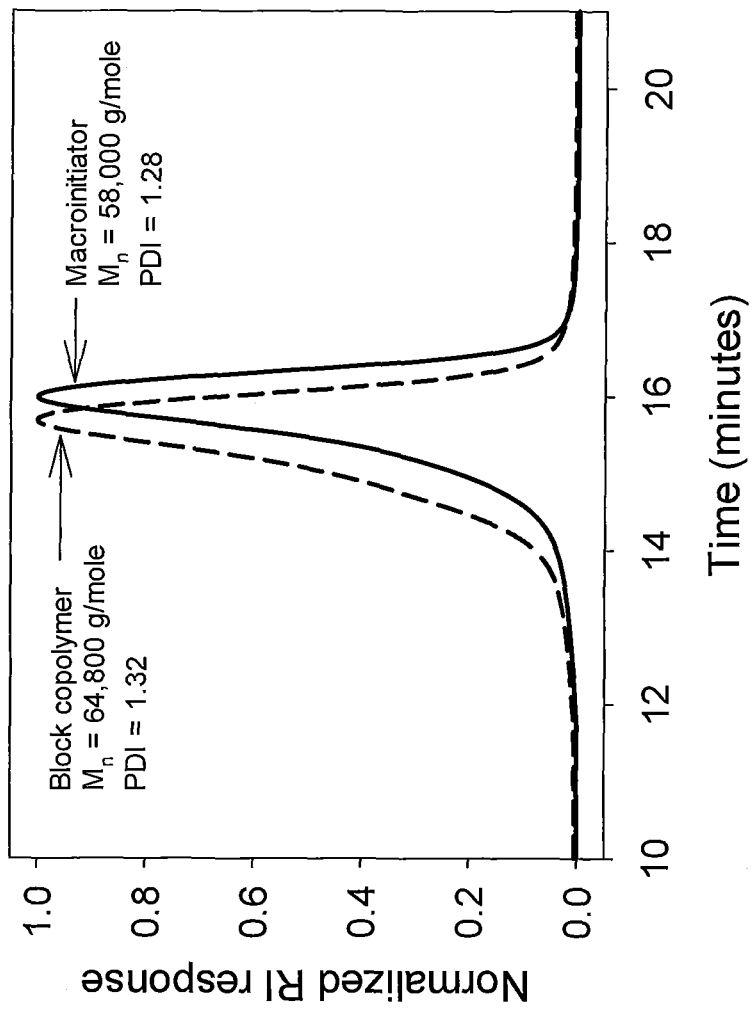
FIG. 6 shows GPC tracings of a mono-functional Soft Block macroinitiator and a block copolymer prepared from it.

The di-block copolymer using the above soft block macroinitiator was prepared as follows. Sodium chloride (1.00 g, 0.017 moles) in DMSO (50 mL); MMA (18.4 g, 0.184 moles) and ethyl acetate (50 mL) were added to the macroinitiator solution and stirred at ambient temperature for 48 hours after which time the MMA was essentially consumed as shown by $^1$H NMR analysis. The resulting polymer was purified as follows. The chelating agent etidronic acid was added to the di-block copolymer reaction mixture at a level of 0.125 g, which was 3000 ppm, to sequester the copper ions. The reaction with the etidronic acid was carried out at 40° C. for 2 hours. The reaction mixture turned white during this time. Then 60 ml of ethyl acetate was added and the mixture was filtered under pressure through a 2 mm porous paper filter mat having pores of 0.5 micron (μ). The filtered solution was transferred to a separatory funnel and washed three times with 50 ml of a brine solution of 20% sodium chloride. The first two washes were for 2 hours each, the third was for 14 hours. The washings resulted in two optically clear and fully separated phases. The lower, aqueous phase, in each washing was removed and discarded. The final organic phase was dried for 16 hours over sodium sulfate. Then as a final step the ethyl acetate was removed with a rotovap at 75° C. under a vacuum of 2 mTorr for 3 hours. The structure was confirmed by $^1$H NMR analysis to be the desired block copolymer. GPC analysis indicated that the molecular weight had increased over that of the macroinitiator, further confirming the block copolymer architecture the final molecular weight was 64,800 g/mole and it had a PDI of 1.32. The GPC tracings for the mono-functional Soft Block macroinitiator and the block polymer produced from it are shown in FIG. 6.

Hydrolysis of Tert-Butyl Acrylate

The monomer acrylic acid does not very readily copolymerize under the SET-LRP process; however it is an important monomer to include due to the contributions it makes to the adhesive properties of hot melt adhesives. In the present disclosure tert-butyl acrylate (tBA) is used as a protected form of acrylic acid. As described above the tBA is used in the formation of Soft Block macroinitiators and for polymerization from a Hard Block macroinitiator. After incorporation of the tBA into the polymer its ester groups are selectively removed to provide the carboxylic acid functions of the acrylic acid. This can be accomplished by acidolysis/hydrolysis or by thermolysis.

After formation of the block copolymers, formic acid was added to the reaction mixture at a level of 10 times the amount of tBA to hydrolyze the tBA. The reaction with formic acid was carried out at 60° C. for 16 hours. The conversion was complete as shown by $^1$H-NMR testing. In addition, the acid number of the polymer before and after hydrolysis was measured in acetone and isopropanol and the results showed greater than 92% conversion.

Hydrolysis and Analysis of the Photoinitiator

One concern could be that the acid hydrolysis used to convert the tBA to acrylic acid might also lead to hydrolysis of a photoinitiator like benzophenone in the block copolymers. If this occurred the UV curability and crosslinking functionality would be lost or greatly reduced for the block copolymer. A test polymer having very high levels of benzophenone was created as follows. A polymer was created as above described for formation of Soft Block macroinitiators using as the monomers nBA at 70 mole % and 4-benzoylphenyl methacrylate at 30 mole %. The conversion in the final product was 90% with a Mn of 15,000 g/mole. The incorporation of benzophenone was confirmed by GPC and UV detection. The test polymer was brought up in a 50:50 mixture of DMSO and ethyl acetate at a level of 2 parts solvent to 1 part polymer. This was then exposed to 10 parts formic acid per 1 part of benzophenone at 70° C. for 16 hours. The potential hydrolysis product was 4-hydroxy benzophenone. Analysis of the polymer by GPC before and after hydrolysis showed there was no change in the level of polymer or increase in the photoinitiator monomer. Analysis by $^1$H-NMR spectra showed no change between before and after hydrolysis. Finally, infrared analysis showed no presence of any OH group in the sample. Thus, the acid hydrolysis conditions used will not result in hydrolysis of the photoinitiator from the block copolymers.

Thermolytic Cleavage of Tert-Butyl Acrylate

To test the conditions for thermolytic cleavage a high content tBA polymer was produced using as monomers nBA (60 mole %) and tBA (40 mole %) using the SET-LRP process described for Soft Block macroinitiators above. The resulting copolymer had a Mn of 15,000 g/mole. Theoretically, complete thermolysis of this copolymer would be expected to result in a weight loss of 17.02%. Thermolytic loss of tBA is expected at about 180° C. The TGA analysis was performed as follows. The copolymer was jumped to a temperature of 110° C. and held there for 20 minutes to remove any residual solvent. The copolymer was then ramped up to 300° C. at a rate of 10° C./minute. There was an inflexion point at 250° C. indicating degradation of the copolymer. The weight loss from 180° C. to 250° C. was 18%, which is very close to the theoretical loss of 17.02%. In addition, separate isotherms at 160° C., 170° C., and 180° C. were run for two hours. The weight losses were the following respectively: 8.37%, 12.04% and 17.04%. Thus, these conditions can also be used to convert the tBA in the copolymers from tBA to acrylic acid functions after formation of the polymers.

Formation of a Tri-Block Copolymer Using a Di-Functional Soft Block Macroinitiator Soft Block 42/28/25/5 Di-Functional Macroinitiator Formation The di-functional Soft Block macroinitiator was prepared using the components given below in TABLE 6. This Soft Block has on a mole proportion basis 42/28/25/5 of nBA/2-EHA/MA/tBA. The monomers, DMSO, ethyl acetate, dimethyl 2,6-dibromoheptanedioate initiator, and Me$_6$TREN ligand were added to a 250 ml 4-necked flask. The flask was fitted with a mechanical stirrer, heating mantel, reflux condenser, thermocouple, nitrogen inlet with sparging tube, and a septum-sealed addition port. The mixture was mechanically stirred for 10 minutes to give a clear solution and then degassed with a low flow of nitrogen through the sparging tube for 20 minutes at room temperature. The bubbling tube was removed and the reactor headspace was swept with nitrogen for 10 minutes. The hydrazine-activated copper wire, 20 equivalents relative to the initiator 7.6 cm$^2$, was wound into a coil and added to the reactor. The reactor was sealed and maintained under a slight positive pressure of nitrogen just above atmospheric pressure. The reaction temperature increased slowly over the next three hours to 30° C., when it reached 30° C. the reaction mixture was heated to 35° C. and maintained at that temperature for an additional 13 hours. Samples were withdrawn for testing at selected time points using a nitrogen-purged gas-tight syringe inserted via the septum. After a total of 16 hours of reaction time the conversion was 97%, the viscosity of the solution had increased, and the color of the solution was a light green with slight opacity. The cooper wire was removed from the reactor and the contents were exposed to air for 30 minutes to quench the reaction. The final di-functional Soft Block macro initiator solution could then be used as a macroinitiator for synthesis of end blocks to form a tri-block copolymer without any further purification. It had a molecular weight of 41,000 g/mole and a polydispersity index of 1.17.

TABLE 6

| Component | Grams | Millimoles | Monomer mole % | Volume milliliters |
|---|---|---|---|---|
| 2 EHA | 20 | 108 | 28 | |
| nBA | 20 | 156 | 42 | |
| MA | 7.66 | 89 | 25 | |
| tBA | 2.42 | 18 | 5 | |
| DMSO | | | | 40 |
| Ethyl acetate | | | | 40 |
| dimethyl 2,6-dibromoheptanedioate | 0.400 | 1.11 | | |
| Me$_6$TREN | 0.051 | 0.222 | | |
| Activated copper wire | 1.414 | 22.25 | | |

Formation of a Tri-Block Copolymer Using the Soft Block Di-Functional Macroinitiator To form a tri-block copolymer the components of TABLE 7 were added to the solution of Soft Block prepared as described in TABLE 6. First the MMA, DMSO, ethyl acetate, and sodium chloride were added to the Soft Block macroinitiator. The mixture was stirred for 3 hours at 35° C. to completely solubilize the sodium chloride. As explained elsewhere in the specification, the sodium chloride participates in a halogen exchange reaction with the bromine on the ends of the Soft Block macroinitiator. As discussed, the Soft Block macroinitiator with the terminal bromine is inefficient at initiating addition of MMA onto itself. Replacing the bromine with chloride significantly enhances the addition of MMA onto the Soft Block macroinitiator. The solution was then degassed with nitrogen as described above and the hydrazine-activated copper wire coil was added to the reaction mixture under the conditions used for formation of the Soft Block macroinitiator. The reaction was maintained at 35° C. with stiffing for 24 hours. After 24 hours the conversion of the MMA was estimated to be 90% by $^1$H-NMR testing. The copper wire was removed and the reaction quenched by exposure to air for 30 minutes. Residual acrylate monomers were not detected. The produced tri-block copolymer has end blocks of the Hard Blocks of poly methyl methacrylate (PMMA) with an internal Soft Block of the macroinitiator. The target addition of Hard Block is from about 4,000 g/mole to 15,000 g/mole.

TABLE 7

| Component | Grams | Millimoles | Volume milliliters |
|---|---|---|---|
| MMA | 11.13 | 0.111 | |
| DMSO | | | 20 |
| Ethyl acetate | | | 20 |
| Sodium chloride | 0.259 | 4.44 | |
| Soft Block macroinitiator | Total from table 6 | 1.11 | |
| Activated-copper wire | 1.414 | 22.25 | |

Purification of the Tri-Block Copolymer

The chelating agent etidronic acid was added to the tri-block copolymer reaction mixture at a level of 0.125 g, which was 3000 ppm, to sequester the copper ions. The reaction with the etidronic acid was carried out at 40° C. for 2 hours. The reaction mixture turned white during this time. Then 60 ml of ethyl acetate was added and the mixture was filtered under pressure through a 2 mm porous paper filter mat having pores of 0.5 micron (μ). The filtered solution was transferred to a separatory funnel and washed three times with 50 ml of a brine solution of 20% sodium chloride. The first two washes were for 2 hours each, the third was for 14 hours. The washings resulted in two optically clear and fully separated phases. The lower, aqueous phase, in each washing was removed and discarded. The final organic phase was dried for 16 hours over sodium sulfate. Then as a final step the ethyl acetate was removed with a rotovap at 75° C. under a vacuum of 2 mTorr for 3 hours. The final block copolymer had a molecular weight of 59,300 g/mole and a polydispersity index of 1.29. The block copolymer produced and purified according to the present disclosure had very little color which was in contrast to usually produced block copolymers which have dark colorations of unknown origin.

Formation of a Tri-Block Copolymer Using a Di-Functional Hard Block Macroinitiator PMMA Hard Block Di-Functional Macroinitiator Formation A di-functional Hard Block macroinitiator was prepared using the components given below in TABLE 8. The MMA, DMSO, dimethyl 2,6-dibromoheptanedioate initiator, and Me$_6$TREN were added to a 250 ml 4-necked flask. The flask included a mechanical stirrer, heating mantel, reflux condenser, thermocouple, nitrogen inlet with sparging tube, and septum-sealed addition port. The mixture was stirred for 10 minutes to give a clear solution and then degassed with a low flow of nitrogen through the sparging tube for 20 minutes at room temperature. The bubbling tube was removed and the reactor headspace was swept with nitrogen for 10 minutes. The hydrazine-activated copper wire, used at 5 equivalents 20.31 cm$^2$, was wound into a coil and added to the reactor. The reactor was sealed and maintained under a slight positive pressure of nitrogen just above atmospheric pressure. The reaction temperature increased slowly over the next three hours to 25° C., when it reached 25° C. the reaction mixture was heated to 30° C. and maintained at that temperature for an additional 24 hours. Samples were withdrawn for testing at selected time points using a nitrogen-purged gas-tight syringe inserted via the septum. After a total of 27 hours of reaction time the conversion was 92%, the viscosity of the solution had increased, and the color of the solution was a light green with slight opacity. The copper wire was removed from the reactor and the contents were exposed to air for 30 minutes to quench the reaction. The propagation rate of MMA under SET-LRP is about 5 to 10 times slower than for MA under identical conditions. The target molecular weight range for the Hard Block macroinitiator is from 4,000 g/mol to 15,000 g/mol. Analysis of the product via DSC at ramps of either 10° C./minute or 20° C./minute both gave Tg values very close to 115° C., corresponding closely to literature values. It was found during experimentation that the level of copper wire needed to be kept at about 1 to 5 equivalents relative to the initiator. When levels above 5 were used the conversion rate was reduced, at a level of 10 equivalents the maximum conversion that could be achieved was only 70%.

TABLE 8

| Component | Grams | Millimoles | Volume |
|---|---|---|---|
| MMA | 80 | 800 | |
| DMSO | | | 80 |
| dimethyl 2,6-dibromoheptanedioate | 4.32 | 12 | |
| Me$_6$TREN | 0.552 | 2.4 | |
| Activated copper wire | 3.78 | 59.48 | |

Purification of Hard Block Di-Functional Macroinitiator

The crude reaction mix of the macroinitiator was combined with 250 ml of ethyl acetate. Then the mixture was washed three times with 50 ml each of a 20% brine solution of sodium chloride in a separatory funnel. The first washings were two hours, the third was 14 hours. The lower aqueous phases were discarded. The final organic phase was dried over sodium sulfate for 16 hours and then the ethyl acetate was removed with a rotovap at 75° C., 4 hours. The product was a white powder, it had a molecular weight of 9,225 g/mole and a polydispersity value of 1.70.

Formation of a Tri-Block Copolymer Using the Hard Block Di-Functional Macroinitiator To form a tri-block copolymer using the di-functional Hard Block macroinitiator the components of TABLE 9 were reacted. First the monomers, DMSO, ethyl acetate, and Me$_6$TREN were added to the PMMA Hard Block macroinitiator in a 1 liter 4-neck flask. The flask had a mechanical stirrer, heating mantel, reflux condenser, thermocouple, nitrogen inlet with sparging tube and septum-sealed addition port. The mixture was stirred for 4 hours to give a clear solution and then degassed by bubbling nitrogen at a low flow rate through the sparging tube for 20 minutes at room temperature. The sparging tube was removed and the headspace was swept with nitrogen gas for 10 minutes. The hydrazine-activated copper mesh was wound into a coil and added to the reaction mixture and it was sealed under a slight positive pressure of nitrogen just above atmospheric pressure. The temperature slowly increased over three hours to 35° C. and was maintained at this temperature with stirring for an additional 13 hours. After 16 hours the conversion of the monomers was estimated to be 95% by $^1$H-NMR testing. The copper mesh was removed and the reaction quenched by exposure to air for 30 minutes. The viscosity of the solution had increased and it had a green color with slight opacity.

TABLE 9

| Component | Grams | Millimoles | Volume |
|---|---|---|---|
| 2-EHA | 103 | 561 | |
| nBA | 104 | 815 | |
| MA | 40 | 463 | |
| tBA | 13 | 104 | |
| DMSO | | | 220 |
| Ethyl acetate | | | 220 |

TABLE 9-continued

| Component | Grams | Millimoles | Volume |
|---|---|---|---|
| PMMA Hard Block macroinitiator | 42.41 | 6.525 | |
| Me$_6$TREN | 0.300 | 1.305 | |
| Activated-Copper mesh | 1 | 15.74 | |

Purification of Tri-Block Copolymer

The chelating agent etidronic acid was added to the tri-block copolymer reaction mixture at a level of 1.447 g, which was 3000 ppm, to sequester the copper ions. The reaction with the etidronic acid was carried out at 40° C. for 2 hours. The reaction mixture turned white during this time. Then 60 ml of ethyl acetate was added and the mixture was filtered under pressure through a 2 mm porous paper filter mat having pores of 0.5µ. The filtered solution was transferred to a separatory funnel and washed three times with 50 ml of a brine solution of 20% sodium chloride. The first two washes were for 2 hours each, the third was for 14 hours. The washings resulted in two optically clear and fully separated phases. The lower, aqueous phase, in each washing was removed and discarded. The final organic phase was dried for 16 hours over sodium sulfate. Then as a final step the ethyl acetate was removed with a rotovap at 75° C. under a vacuum of 2 mTorr for 3 hours. The product had a molecular weight of 42,103 g/mole and a polydispersity index of 1.26. The product has little to no color as described above for the block copolymer produced from a Soft Block macroinitiator.

The foregoing disclosure has been described in accordance with the relevant legal standards, thus the description is exemplary rather than limiting in nature. Variations and modifications to the disclosed embodiment may become apparent to those skilled in the art and do come within the scope of the disclosure. Accordingly, the scope of legal protection afforded this disclosure can only be determined by studying the following claims.

We claim:

1. A method of forming a macroinitiator polymer by a single electron transfer living radical polymerization comprising the steps of:
   a) providing a reaction mixture comprising a plurality of vinyl monomers, a polymerizable photoinitiator, a halogen terminated initiator, and a ligand in a solvent;
   b) purging the reaction mixture with nitrogen; and
   c) adding to the reaction mixture a solid copper hydrazine-activated catalyst and polymerizing the reaction mixture by single electron transfer living radical polymerization in the presence of the catalyst under a positive pressure of nitrogen to produce a macroinitiator polymer including a photoinitiator polymerized therein, the macroinitiator having a molecular weight of from 55,000 to 75,000 grams/mole, a polydispersity index of 1.2 to 1.8, and a glass transition temperature of less than 20° C.

2. The method of claim 1, wherein the vinyl monomers provided in step a) are selected from the group consisting of 2-ethylhexyl acrylate, methyl acrylate, n-butyl acrylate, tert-butyl acrylate, and mixtures thereof.

3. The method of claim 1, wherein step a) comprises providing a bromine terminated initiator.

4. The method of claim 1, wherein step a) comprises providing as the initiator one of dimethyl 2,6-dibromoheptanedioate and methyl-2-bromopropionate.

5. The method of claim 1, wherein step a) comprises providing as the ligand hexamethylated tris (2-aminoethyl) amine.

6. The method of claim 1, wherein step a) comprises providing as the solvent a blend of dimethyl sulfoxide and ethyl acetate.

7. The method of claim 1 wherein said polymerizable photoinitiator is selected from the group consisting of 4-benzoylphenyl methacrylate, a (methyl)acrylate ester substituted xanthone, a (methyl)acrylate ester substituted thioxanthone, a (methyl)acrylate ester substituted benzyl, a (methyl)acrylate ester substituted phenanthrenequinone, a (methyl)acrylate ester substituted anthraquinone, a (methyl) acrylate ester substituted benzophenone, and mixtures thereof.

8. The method of claim 1 wherein said polymerizable photoinitiator is present in an amount of up to 1 mole % based on the total number of moles of monomer in the reaction mixture in step a).

9. A method of forming a block copolymer by a single electron transfer living radical polymerization comprising the steps of:
   a) combining the macroinitiator polymer from claim 1 with at least one additional vinyl monomer, additional solvent, and 1 equivalent of a source of CI per terminal halogen equivalent in the macroinitiator polymer to form a halogen exchange reaction mixture;
   b) incubating the halogen exchange reaction mixture at 35° C. for at least 3 hours with stirring;
   c) after step b) adding to the halogen exchange reaction mixture a solid copper hydrazine-activate catalyst and polymerizing the at least one additional vinyl monomer for a period of time sufficient to increase the molecular weight of the macroinitiator polymer by 4,000 to 15,000 gram/mole while maintaining the polydispersity index at 1.2 to 1.8.

10. The method of claim 9, wherein step a) comprises using as said at least one additional vinyl monomer methyl methacrylate.

11. The method of claim 9, further comprising after step c) a purification process comprising:
   d) adding to the product of step c) 3000 ppm of etidronic acid and incubating the mixture at 40° C. for 2 hours;
   e) adding additional solvent to the mixture of step d) and filtering the mixture through a filter having pores of 0.5 microns;
   f) washing the filtrate of step e) with a brine solution of 20% sodium chloride a plurality of times and retaining the organic phase from each washing; and
   g) drying the organic phase and then removing the solvent by evaporation to produce a powdered form of the block copolymer.

12. The method of claim 9, further comprising in step a) of claim 9 providing at least one polymerizable photoinitiator in said halogen exchange reaction mixture, said photoinitiator polymerizing into said polymer in step c) of claim 9 and providing UV curable crosslinking functionality to said block copolymer.

13. A method of forming a macroinitiator polymer a single electron transfer living radical polymerization comprising the steps of:
   a) providing a reaction mixture comprising at least one vinyl monomer, a polymerizable photoinitiator, a halogen terminated initiator, and a ligand in a solvent;
   b) purging the reaction mixture with nitrogen; and
   c) adding to the reaction mixture a solid copper hydrazine-activated catalyst and polymerizing the reaction mixture by single electron transfer living radical polymerization in the presence of the catalyst under a positive pressure of nitrogen to produce a macroinitiator polymer including a photoinitiator polymerized therein, the macroinitiator having a molecular weight of from 4,000 to 15,000 grams/mole, a polydispersity index of 1.2 to 1.8, and a glass transition temperature of greater than 80° C.

14. The method of claim 13, wherein step a) comprises providing as the at least one vinyl monomer methyl methacrylate.

15. The method of claim 13, wherein step a) comprises providing a bromine terminated initiator.

16. The method of claim 13, wherein step a) comprises providing as the initiator one of dimethyl 2,6-d ibromoheptanedioate and methyl-2-bromopropionate.

17. The method of claim 13, wherein step a) comprises providing as the ligand hexamethylated tris (2-aminoethyl) amine.

18. The method of claim 13, wherein step a) comprises providing as the solvent dimethyl sulfoxide.

19. The method of claim 13 wherein said polymerizable photoinitiator is selected from the group consisting of 4-benzoylphenyl methacrylate, a (methyl)acrylate ester substituted xanthone, a (methyl)acrylate ester substituted thioxanthone, a (methyl)acrylate ester substituted benzyl, a (methyl)acrylate ester substituted phenanthrenequinone, a (methyl)acrylate ester substituted anthraquinone, a (methyl) acrylate ester substituted benzophenone, and mixtures thereof.

20. The method of claim 13 wherein said polymerizable photoinitiator is present in an amount of up to 1 mole % based on total number of moles of monomer in the reaction mixture.

21. The method of claim 13 comprising the further steps after step c) of:
   d) adding to the product of step c) 3000 ppm of etidronic acid and incubating the mixture at 40° C. for 2 hours;
   e) adding additional solvent to the mixture of step d) and filtering the mixture through a filter having pores of 0.5 microns;
   f) washing the filtrate of step e) with a brine solution of 20% sodium chloride a plurality of times and retaining the organic phase from each washing; and
   g) drying the organic phase and then removing the solvent by evaporation to produce a powdered form of the macroinitiator polymer.

22. A method of forming a block copolymer by a single electron transfer living radical polymerization comprising the steps of:
   a) combining the macroinitiator polymer from claim 21 step g) with at least one additional vinyl monomer, solvent, and ligand to form a reaction mixture;
   b) incubating the reaction mixture from step a) with stirring for a period of time sufficient to form a clear reaction mixture;
   c) after step b) adding to the clear reaction mixture a solid copper hydrazine-activate catalyst and polymerizing the at least one additional vinyl monomer for a period of time sufficient to increase the molecular weight of the macroinitiator polymer by 55,000 to 75,000 grams/mole while maintaining the polydispersity index at 1.2 to 1.8.

23. The method of claim 22, wherein step a) comprises using as said additional vinyl monomers vinyl monomers selected from the group consisting of 2-ethylhexyl acrylate, methacrylate, n-butyl acrylate, tert-butyl acrylate, and mixtures thereof.

24. The method of claim 22, further comprising after step c) a purification process comprising:
   d) adding to the product of step c) 3000 ppm of etidronic acid and incubating the mixture at 40° C. for 2 hours;
   e) adding additional solvent to the mixture of step d) and filtering the mixture through a filter having pores of 0.5 microns;
   f) washing the filtrate of step e) with a brine solution of 20% sodium chloride a plurality of times and retaining the organic phase from each washing;
   g) drying the organic phase and then removing the solvent by evaporation to produce a powdered form of the block copolymer.

25. The method of claim 22, wherein the period of time for step b) comprises at least 4 hours.

26. The method of claim 22, further comprising in step a) of claim 22 providing at least one polymerizable photoinitiator in said reaction mixture, said photoinitiator polymerizing into said block copolymer in step c) of claim 22 and providing UV curable crosslinking functionality to said block copolymer.

27. The method of claim 26 wherein said polymerizable photoinitiator is selected from the group consisting of 4-benzoylphenyl methacrylate, a (methyl)acrylate ester substituted xanthone, a (methyl)acrylate ester substituted thioxanthone, a (methyl)acrylate ester substituted benzyl, a (methyl)acrylate ester substituted phenanthrenequinone, a (methyl)acrylate ester substituted anthraquinone, a (methyl) acrylate ester substituted benzophenone, and mixtures thereof.

28. The method of claim 26 wherein said polymerizable photoinitiator is present in an amount of up to 1 mole % based on total number of moles of monomer in the reaction mixture of step a) of claim 22.

29. The method of claim 1 wherein during the single electron transfer living radical polymerization the polymerizable photoinitiator is randomly polymerized with the plurality of vinyl monomers into the macroinitiator polymer.

* * * * *

UNITED STATES PATENT AND TRADEMARK OFFICE
CERTIFICATE OF CORRECTION

PATENT NO. : 9,587,062 B2
APPLICATION NO. : 14/570060
DATED : March 7, 2017
INVENTOR(S) : John G. Woods et al.

Page 1 of 1

It is certified that error appears in the above-identified patent and that said Letters Patent is hereby corrected as shown below:

Column 7, Line 13: Change "stiffed" to -- stirred --.

Column 7, Line 52: Change "framed" to -- formed --.

Column 14, Line 59: Change "stiffing" to -- stirring --.

Column 19, Lines 15 and 16: Change "2,6-d ibromoheptanedioate" to -- 2,6-dibromoheptanedioate --.

Signed and Sealed this
Twentieth Day of February, 2018

Andrei Iancu
*Director of the United States Patent and Trademark Office*